Jan. 20, 1953     P. M. FISCHER     2,626,375

CONTROL SYSTEM FOR STAGE ENCORE CURTAIN HOISTING MOTORS

Filed Jan. 15, 1951     3 Sheets-Sheet 1

Inventor
Paul M. Fischer
By W. E. Lyon
Attorney

Fig. 3ᵃ

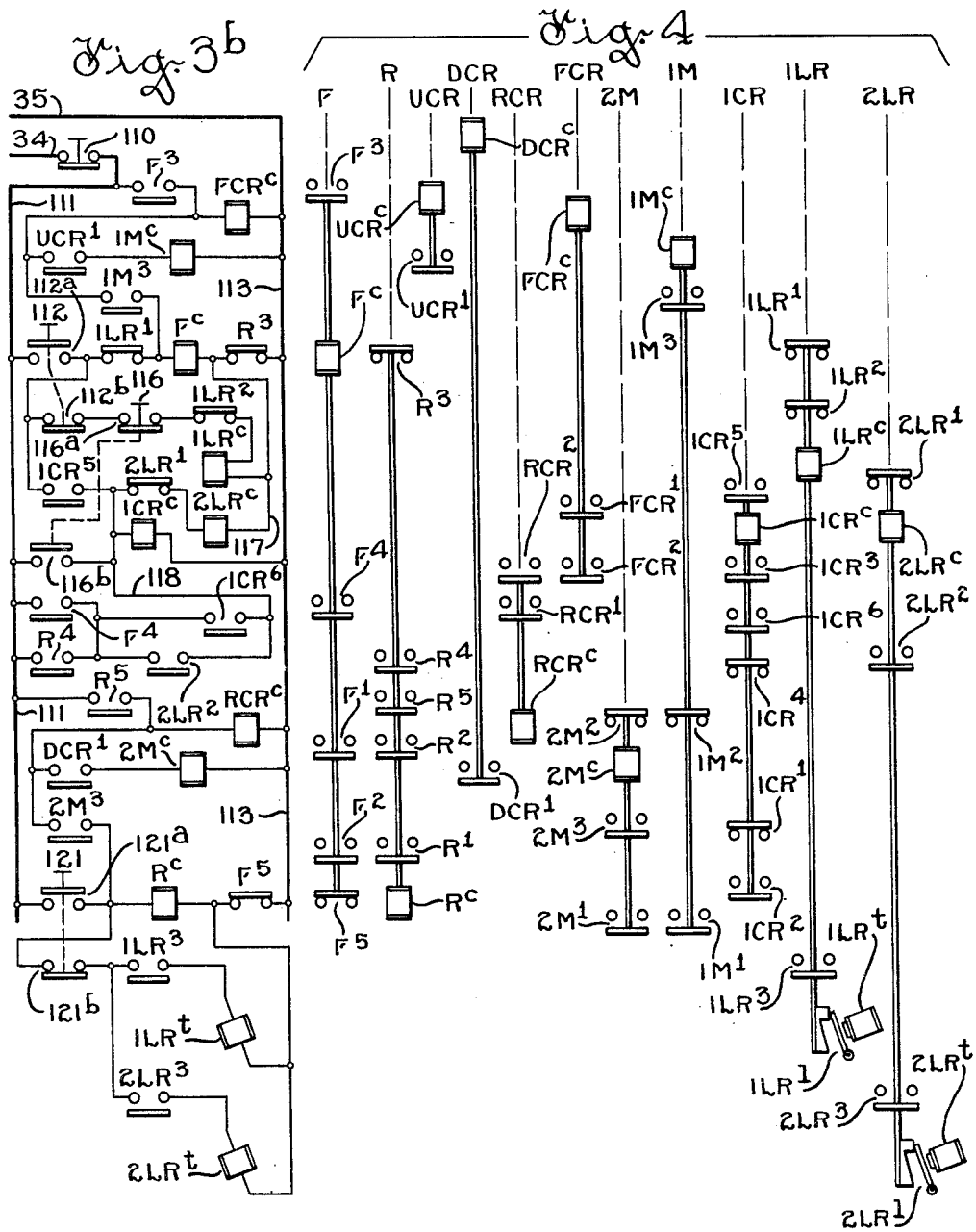

Patented Jan. 20, 1953

2,626,375

UNITED STATES PATENT OFFICE 2,626,375

CONTROL SYSTEM FOR STAGE ENCORE CURTAIN HOISTING MOTORS

Paul M. Fischer, Milwaukee, Wis., assignor to Cutler-Hammer, Inc., Milwaukee, Wis., a corporation of Delaware Application January 15, 1951, Serial No. 206,096

10 Claims. (Cl. 318—67)

This invention relates to stage encore curtains, and more particularly to control systems for motors affording hoisting and lowering of such curtains.

The subject matter of the present invention is in certain respects similar to that disclosed in the Lassen and Seeger Patent No. 2,002,268, issued May 21, 1935, and is an improvement thereon.

A primary object of the present invention is to provide a control system for each of the hoisting motors of a stage encore curtain which will afford most of the desirable features of a control system disclosed in the aforementioned patent and which will, in addition, afford greater accuracy in controlling the preselected range of operation and in regulating the preselected speed of such hoisting motors.

A more specific object of the invention is to provide a control system of the aforementioned character wherein the range of operation of each hoisting motor may be individually preselected from a plurality of preset but adjustable ranges by operation of a single control instrumentality.

Another object is to provide a control system of the aforementioned character wherein the base speed of operation of its associated motor is adjusted according to the range of operation preselected therefor so that such speed will be proportional to such range, thereby insuring that all motors will operate through the ranges preselected therefor in substantially the same interval of time, and A still further object is to provide a control system of the aforementioned character wherein the speed of the motor is maintained substantially constant regardless of variations in the load to which it is subjected.

Other objects and advantages of the invention will hereinafter be apparent.

The accompanying drawings illustrate a preferred embodiment of the invention which will now be described, it being understood that the embodiment illustrated may be modified in respect of details without departing from the scope of the appended claims.

Figure 3:
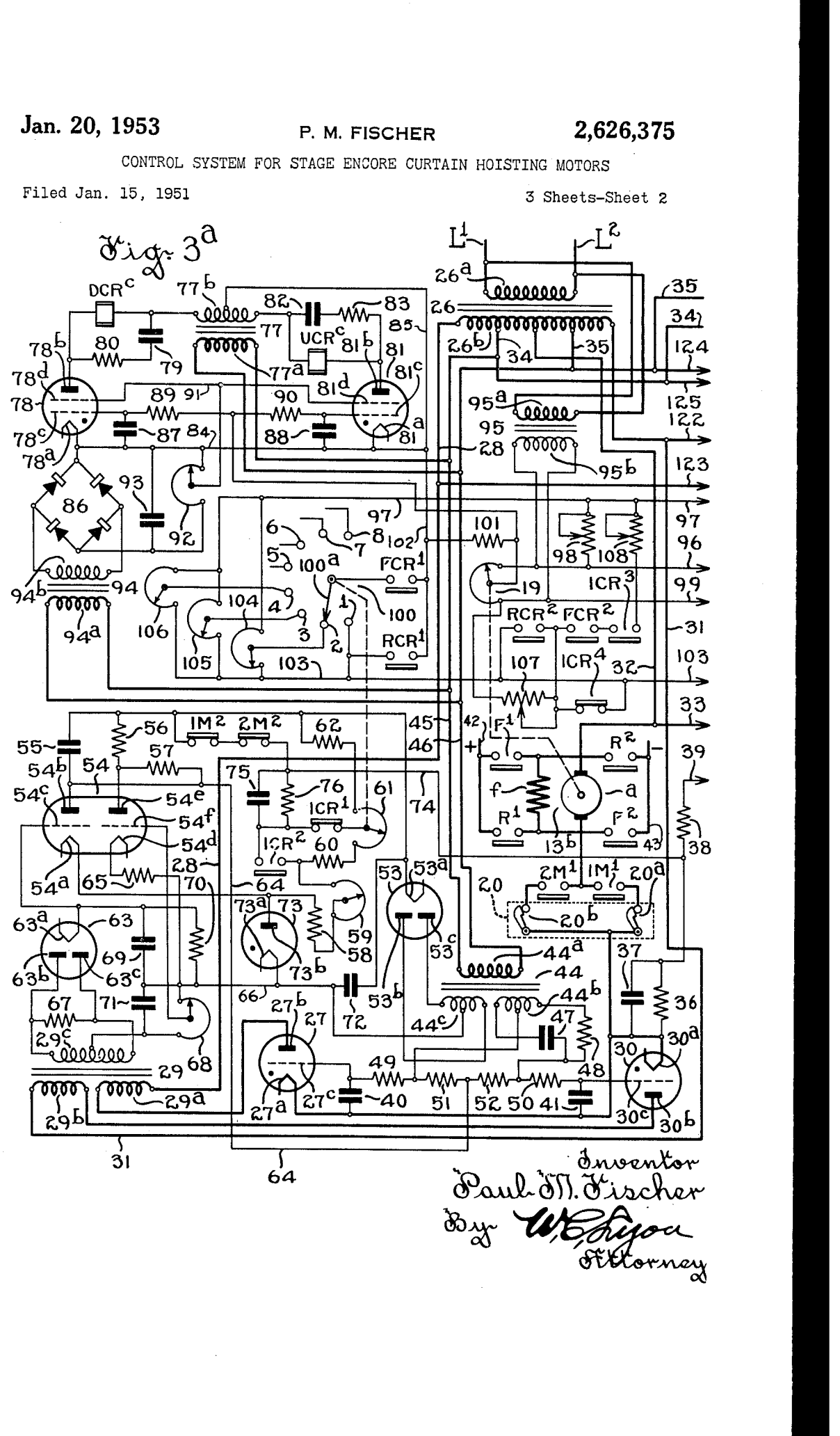

Figs. 3ª and 3ᵇ diagrammatically depict one driving motor and a control system for such motor—Fig. 3ª shows the motor and the part of the control system more or less directly related to control of the motor, while Fig. 3ᵇ shows that part of the control system relating principally to initiating and stopping the action of the part of the control system shown in Fig. 3ª, and Fig. 4 is a schedule of contactors and relays shown in Figs. 3ª and 3ᵇ with their respective contacts shown mechanically coupled to their operating windings, and with such contacts arranged in alinement with the same contacts shown in Figs. 3ª and 3ᵇ.

Figure 1:
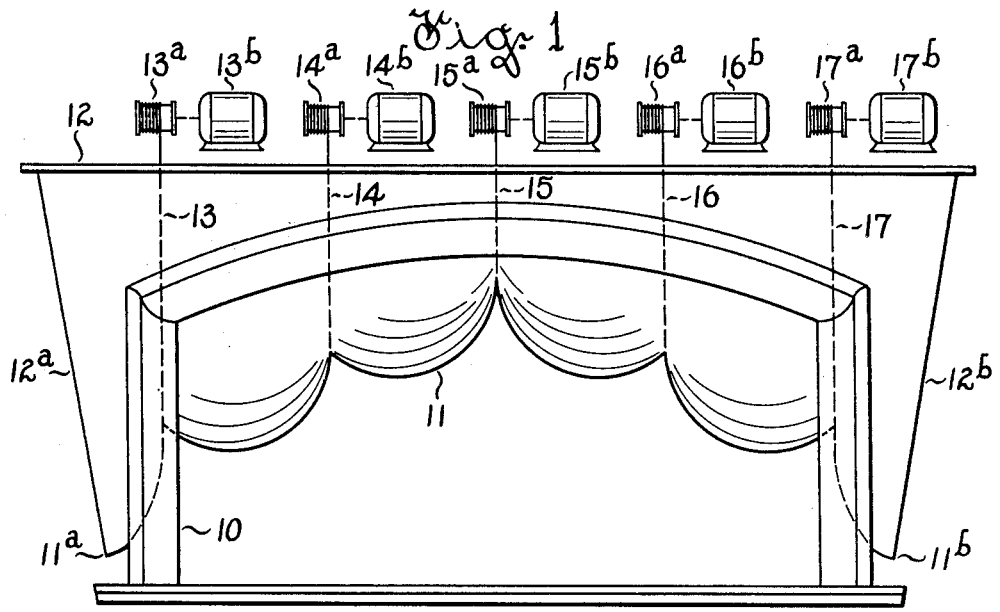
Figure 1 is a front elevational view of the proscenium of a theatrical stage or the like, showing the stage curtain draped or drawn to a contour preselected therefor—a schematic arrangement of hoisting cables, hoisting drums, and drum driving motors being illustrated.

Referring to Fig. 1, the numeral 10 designates in general the proscenium or border of a stage opening, behind which a curtain 11 (which may be termed the "encore" curtain) is hung or mounted, as by attaching the upper end or edge thereof to a fixed supporting bar on cable 12— the height of the curtain with respect to the proscenium on stage opening being such as to suit the particular requirements of an installation. The curtain 11 preferably is of a width considerably in excess of the proscenium whereby the desired fullness thereof to facilitate artistic draping is provided—the opposite ends 11ª and 11ᵇ being preferably attached to cables 12ª and 12ᵇ of fixed length which are in turn attached to bar 12. In Fig. 1 are shown five cables or ropes 13 to 17, inclusive, attached to the rear edge of curtain 11 at spaced points along the lower edge thereof—the other ends of said ropes being respectively attached to sheaves or winding drums 13ª to 17ª, inclusive, which drums are adapted to be rotated in opposite directions selectively by the motors 13ᵇ to 17ᵇ to effect raising and/or lowering of the corresponding portions of the curtain. Thus by properly controlling the operation of the motors 13ᵇ to 17ᵇ, inclusive, the curtain 11 may be lowered at will or drawn to substantially any desired contour.

Figure 2:
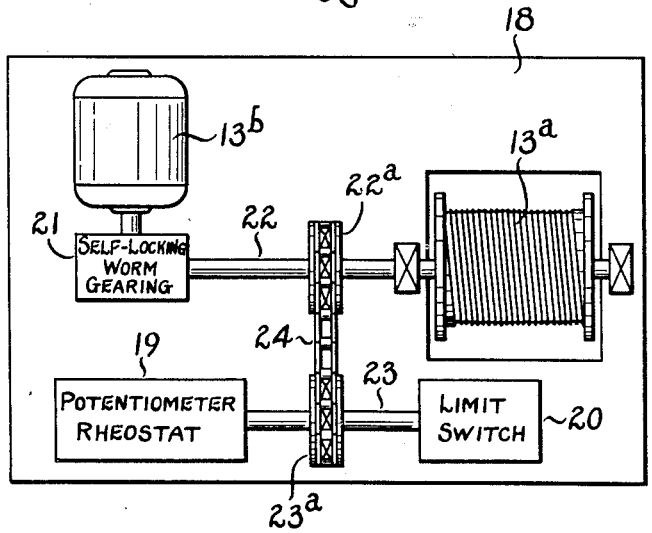
Fig. 2 is a more or less schematic view in top plan showing the preferred arrangement of one hoisting drum, its associated driving motor and certain control apparatus driven by such motor.

Fig. 2 shows a preferred arrangement for the hoisting drum 13ª. Drum 13ª and its associated driving motor 13ᵇ are mounted on a supporting base 18, together with an associated potentiometer rheostat 19 and a limit switch 20. The driving motor is arranged to drive its associated drum through self-locking worm gearing 21 and a shaft 22. The adjusting element of the rheostat 19, and the driving element of the limit switch 20 are interconnected by a shaft 23. Shaft 23 is driven by shaft 22 whenever the latter is rotating through an endless chain 24 running on sprocket wheels 22a and 23a fixed on shafts 22 and 23, respectively.

Use of the self-locking worm gearing 21 in the driving connection between driving motor 13b and hoisting drum 13a obviates need for an electrically controlled brake to maintain the position of such driving motor and hoisting drum upon stopping of the motor. The potentiometer rheostat 19 associated with each such motor and hoisting drum, as will be hereinafter more fully explained, is electrically connected in the control circuit of its associated motor and its adjusting element is moved through a range corresponding to the range of operation of its motor. The limit switch 20 associated with each of the potentiometer rheostats 19, is also electrically connected in a power for driving motor 13b and affords circuit commutations at each of two opposite extreme limits to prevent operation of a driving motor beyond limits which might cause damage to the potentiometer rheostat 19. A preferred form for the limit switch 20 is shown and described in the Hodgson Patent No. 2,519,907, granted August 22, 1950.

As will be understood, each of the other hoisting drums 14a to 17a will be similarly arranged with respect to their respective associated driving motors 14b to 17b, and will, in like manner, have a potentiometer rheostat and limit switch, like rheostat 19 and limit switch 20, associated therewith.

Referring to Figs. 3a, 3b and 4, they show the motor 13b, which is preferably a direct current motor, and the control system for motor 13b. It is to be understood that the control system now to be described for motor 13b, would for the most part, be duplicated for each of the other motors 14b to 17b. The part of the control system shown, and to be described, in connection with Figs. 3b and 4 contains certain control instrumentalities which are common to all the individual control systems for the other motors 14b to 17b, and need not be duplicated for each such control system. These common control instrumentalities will be hereinafter more particularly pointed out.

The portion of the control system first to be described embraces the power supplies for the armature and field of motor 13b inclusive of the operating connections therefor. More particularly, power for energizing the armature $a$ of motor 13b and the control system of the motor is supplied from a single phase alternating current source comprising supply lines $L^1$ and $L^2$. A transformer 26 has the end terminals of its primary winding 26a connected to lines $L^1$ and $L^2$ and has a multi terminal secondary winding 26b. The left-hand end terminal of winding 26b is connected to the anode 27b of an electron discharge tube 27 in series with a conductor 28 and a primary winding 29a of the transformer 29. The right-hand end terminal of winding 26b of transformer 26 is connected to the anode 30b of an electron discharge tube 30, like tube 27, in series with a conductor 31 and a second primary winding 29b of transformer 29. The center-tap terminal of winding 26b of transformer 26 is connected by conductors 32 and 33 to the upper terminal of armature $a$ of motor 13b. Winding 26b has a terminal intermediate its left-hand end terminal and center-tap terminal connected to a conductor 34, and said winding has another terminal intermediate its center-tap and right-hand end terminal which is connected to a conductor 35.

Tubes 27 and 30 are also provided with cathodes 27a and 30a, and control grids 27c and 30c, respectively. The cathodes 27a and 30a of said tubes are connected together, and are connectible to the lower terminal of armature $a$ of the motor, either through contacts 20a of limit switch 20 and normally open contacts 1M¹ of an electromagnetic contactor 1M, or through contacts 20b of limit switch 20 and normally open contacts 2M¹ of an electromagnetic contactor 2M. Cathodes 27a and 30a are also connected through a parallel combination of a resistor 36 and capacitor 37, and a resistor 38 to a conductor 39 to which the cathodes of the corresponding tubes of the control systems would preferably be connected in like manner. A filter capacitor 40 is connected between control grid 27c and cathode 27a of tube 27, and a similar capacitor 41 is connected between control grid 30c and cathode 30a of tube 30.

Field winding $f$ of motor 13b is supplied with D. C. exciting current from the high potential bus 42 and low potential bus 43 of a D. C. source which may be of any preferred type furnishing supply of D. C. current at substantially constant voltage. Winding $f$ is connectable to buses 42 and 43 for current flow in one direction upon closure of normally open contacts $F^1$ and $F^2$ of an electromagnetic contactor F, and is connectable to said buses for current flow in the reverse direction upon closure of normally open contacts $R^1$ and $R^2$ of an electromagnetic contactor R. In the present control system, the direction of current flow through field winding $f$ determines the direction of operation of motor 13b.

The speed of operation of motor 13b, in either direction, is regulated by controlling the conducting periods of the tubes 27 and 30 during their respective conducting half-cycles. That part of the control system pertaining to control and regulation of the conducting periods of tubes 27 and 30 will now be described. More particularly, a transformer 44 has the end terminals of its primary winding 44a connected to conductors 34 and 35 through conductors 45 and 46, respectively, and said transformer is provided with a secondary winding 44b having a center-tap terminal. The end terminals of winding 44b are connected together in series with a capacitor 47 and a resistor 48. The center-tap terminal of winding 44b is connected to control grid 27c of tube 27 in series with a resistor 49. The point common to capacitor 47 and resistor 48 is connected to control grid 30c of tube 30 in series with a resistor 50. Control grids 27c and 30c are connected together through the aforementioned resistors 49 and 50, and through resistors 51 and 52.

Transformer 44 is provided with another secondary winding 44c having a center-tap terminal. The end terminals of winding 44c are connected to the anodes 53b and 53c of a full-wave rectifier tube 53 which has a cathode 53a. The cathode 53a of tube 53 is connected to the anode 54b of the left-hand half of a duo-triode tube 54 in series with a capacitor 55, and said cathode is also connected to the other anode 54e of the right-hand half of tube 54 in series with a resistor 56. Anodes 54b and 54e of tube 54 are connected together through a resistor 57. Anode 54b has associated therewith the cathode 54a and control grid 54c, and anode 54e has associated therewith the cathode 54d and control grid 54f.

Cathode 54a of tube 54 is connected to the point common to cathode 53a of tube 53 and capacitor 55 in series with a resistor 58, an adjustable resistor 59, a resistor 60, the resistance element of a potentiometer rheostat 61, and a resistor 62. Control grid 54$^c$ is connected to cathode 63$^a$ of a full-wave rectifier tube 63 which has a pair of anodes 63$^b$ and 63$^c$. Anode 54$^b$ of tube 54 is connected by a conductor 64 to the point common to resistors 51 and 52. Cathode 54$^d$ is connected in series with a resistor 65 to a conductor 66.

It will be appreciated that two single triode tubes can be used in place of duo-triode tube 54 if desired.

The anodes 63$^b$ and 63$^c$ of tube 63 are connected to the end terminals of a secondary winding 29$^c$ of transformer 29 which has a center-tap terminal. A resistor 67 is connected across anodes 63$^b$ and 63$^c$ of tube 63.

The center-tap terminal of winding 29$^c$ of transformer 29 is connected to conductor 66 in series with the resistance element of a potentiometer rheostat 68, which has its adjusting element connected to control grid 54$^f$ of the left-hand half of tube 54. A capacitor 69 and a resistor 70 are connected in parallel between control grid 54$^c$ of tube 54 and conductor 66. A capacitor 71 is connected between the center-tap terminal of winding 29$^c$ of transformer 29 and conductor 66. A half-wave rectifier tube 73 has its cathode 73$^a$ connected to conductor 66 and its anode 73$^b$ connected to the point common to cathode 54$^a$ of tube 54 and resistor 58.

Normally closed contacts 1CR$^1$ of an electromagnetic contactor 1CR connected in circuit between the adjusting element of rheostat 61 and a conductor 74 in series with a parallel combination of a capacitor 75 and a resistor 76. Normally open contacts 1CR$^2$ of contactor 1CR are connected in circuit between capacitor 75 and resistor 76, and the point common to adjustable resistor 59 and resistor 60. Normally closed contacts 2M$^2$ and 1M$^2$ of contactors 2M and 1M are connected in series between conductor 74 and and the point common to cathode 53$^a$ of tube 53, capacitor 55 and resistor 56.

The part of the control system now to be described comprises a circuit for controlling the range of operation of the motor 13$^b$ in either direction. More particularly, a transformer 77 has a primary winding 77$^a$, which has its end terminals connected to conductors 34 and 35, and has a secondary winding 77$^b$ with a center-tap terminal. The left-hand end terminal of winding 77$^b$ is connected to anode 78$^b$ of an electron discharge tube 78 in series with the electromagnetic operating winding DCR$^c$ of a relay DCR, which has a series connected capacitor 79 and resistor 80 connected in shunt thereacross. The right-hand end terminal of winding 77$^b$ is connected to anode 81$^b$ of a tube 81, like tube 78, in series with the electromagnetic operating winding UCR$^c$ of a relay UCR, which has a series connected capacitor 82 and resistor 83 connected in shunt thereacross.

Tube 78 is also provided with a cathode 78$^a$, a control grid 78$^c$ and a screen grid 78$^d$. Tube 81 is likewise provided with a cathode 81$^a$, a control grid 81$^c$ and a screen grid 81$^d$. Cathodes 78$^a$ and 81$^a$ of tubes 78 and 81 are connected together through a conductor 84, and to the center-tap terminal of winding 77$^b$ of transformer 77 through a conductor 85. Cathode 78$^a$ of tube 78 is also connected to a D. C. terminal of a full-wave rectifier bridge 86. A filter capacitor 87 is connected between control grid 78$^c$ and cathode 78$^a$ of tube 78, and a similar capacitor 88 is connected between control grid 81$^c$ and cathode 81$^a$ of tube 81. Control grid 78$^c$ of tube 78 is connected to the adjusting element of potentiometer rheostat 19 in series with a resistor 89, and control grid 81$^c$ of tube 81 is likewise connected to such adjusting element in series with a resistor 90. The screen grids 78$^d$ and 81$^d$ of tubes 78 and 81 are connected together through a conductor 91.

Rectifier bridge 86 has its other D. C. terminal connected to conductor 84 in series with the resistance element of a potentiometer rheostat 92, and in series with a capacitor 93 which parallels the resistance element of rheostat 92. The adjusting element of rheostat 92 is connected to conductor 91. The A. C. terminals of rectifier bridge 86 are connected to the end terminals of a secondary winding 94$^b$ of a transformer 94, which has a primary winding 94$^a$ with its end terminals connected to conductors 45 and 46.

A transformer 95 has the end terminals of its primary winding 95$^a$ connected to supply lines L$^1$ and L$^2$ and is provided with a secondary winding 95$^b$. One end terminal of winding 95$^b$ is connected to a conductor 96, which conductor is connected to a conductor 97 in series with an adjustable resistor 98. The other end terminal of winding 95$^b$ is connected to a conductor 99. The resistance element of potentiometer rheostat 19 is connected at one end to conductor 96 between adjustable resistor 98 and the first mentioned end terminal of winding 95$^b$, and is connected at its other end to conductor 99.

The rotary contact arm 100$^a$ of a rotary selector switch 100 is connectable to the point common to the adjusting element of rheostat 19, resistor 89 and resistor 90 through normally open contacts FCR$^1$ of an electromagnetic relay FCR and a resistor 101. A conductor 102 is connected to conductor 85 at one end and at its other end to the point common to the right-hand contact of normally open contacts RCR$^1$ of an electromagnetic relay RCR and resistor 101. The left-hand contact of contacts RCR$^1$ is connected to a conductor 103, and to stationary contact 1 of selector switch 100.

Selector switch 100 also has stationary contacts 2 to 8, inclusive. Contacts 2, 3 and 4 are connected to the adjusting elements of potentiometer rheostats 104, 105 and 106, respectively, which rheostats have their resistance elements connected in parallel across conductors 97 and 103. Although not shown, it may be assumed that a plurality of other potentiometer rheostats, like rheostats 104, 105 and 106, have their resistance elements connected in parallel across conductors 97 and 103 and have their adjusting elements connected to contacts 5, 6, 7 and 8 of selector switch 100, respectively. The rotary contact arm 100$^a$ of selector switch 100 is mechanically connected to the adjusting element of potentiometer rheostat 61 to afford adjustment of such element in accordance with the switch position selected.

An adjustable resistor 107 is connected at one end to the point common to the lower end of the resistance element of rheostat 19 and conductor 99 and is connected at its other end to the point common to the right-hand contact of normally closed contacts 1CR$^4$ of relay 1CR, the right-hand contact of normally open contacts RCR$^2$ of relay RCR and the left-hand contact of normally open contacts FCR$^2$ of relay FCR.

An adjustable resistor 108 is connected at one end to conductor 97 and at its other end to the right-hand contact of contacts FCR$^2$ in series with normally open contacts 1CR$^3$ of relay 1CR.

Referring to Figs. 3b and 4, they show that part of the control system having to do with initiating and stopping the action of those parts of the control system hereinbefore described. More particularly, conductor 34 is connected through normally closed contacts of push-button switch 110 to a conductor 111. A push-button switch 112 has its normally open contacts 112a connected through its left-hand contact to conductor 111, and through its right-hand contact through normally closed contacts 1LR¹ of an electromagnetic latching relay 1LR, the operating winding Fc of contactor F, normally closed contacts R³ of contactor R, and conductor 113 to conductor 35. The right-hand contact of contacts 112a is also connected in circuit with the left-hand contact of contacts 112b of said switch and the left-hand contact of normally open contacts 1CR⁵ of relay 1CR. Contacts 1LR¹ are also connected through the right-hand contact thereof to the left-hand contact of contacts 1M³ of contactor 1M.

Contactor F has normally open contacts F³ which are connected in circuit with conductor 111, the left-hand contacts of normally open contacts 1M³ and UCR¹ of contactor 1M and relay UCR¹, respectively, and to the left-hand end of the operating winding FCRc of relay FCR. The right-hand contact of contacts UCR¹ is connected through the operating winding 1Mc of contactor 1M to conductor 113.

Contacts 112b of switch 112 are connected through the right-hand contact thereof to the left-hand contact of normally closed contacts 116a of a push-button switch 116. The right-hand contact of contacts 116a is connected through normally closed contacts 1LR² of relay 1LR, and the operating winding 1LRc of relay 1LR to a conductor 117, which is connected at one end to the point common to the operating winding Fc of contactor F and the left-hand contact of contacts R³ of contactor R.

The right-hand contact of contact 1CR⁵ of relay 1CR is connected to conductor 117 in series with normally closed contacts 2LR¹ of an electromagnetic latching relay 2LR and the operating winding 2LRc of said relay. Normally open contacts 116b are connected through the left-hand contact thereof to conductor 111, and through the right-hand contact thereof to a conductor 118, which is connected to the point common to the right-hand contact of contacts 1CR⁵ and the left-hand contact of contacts 2LR¹. Contactors F and R have normally open contacts F⁴ and R⁴, respectively, which are connected through their left-hand contacts respectively to conductor 111, and though their right-hand contacts, respectively to the left-hand contacts of contacts 2LR² and 1CR⁶ of relays 2LR and 1CR, respectively. Contacts 2LR³ and 1CR⁶ are connected through their respective right-hand contacts to the operating winding 1CRc of relay 1CR, having connection with conductor 113.

Contactor R also has additional normally open contacts R⁵, which are connected through the left-hand contact thereof to conductor 111. The right-hand contact of contacts R⁵ is connected in circuit with normally open contacts 2M³ of contactor 2M, the operating winding Rc of contactor R, normally closed contacts F⁵ of contactor F to conductor 113. The last mentioned contact of contacts R⁵ is also connected in circuit with normally open contacts DCR¹ and the operating winding 2Mc of contactor 2M to conductor 113, and, with the operating winding RCRc of relay RCR to conductor 113.

A push-button switch 121 has its normally open contacts 121a connected through the left-hand contact thereof to conductor 111. The right-hand contact of contacts 121a is connected to the point common to the right-hand contact of contacts 2M³ and the operating winding Rc of relay R. Such right-hand contact of contacts 121a is also connected in circuit with the normally closed contacts 121b of switch 121. The right-hand contact of contacts 121b is connected in circuit in series with normally open contacts 1LR³ of relay 1LR, and the latch-tripping winding 1LRt of relay 1LR. Such right-hand contact of contacts 121b is also connected in circuit in series with contacts 2LR³ of relay 2LR and the latch-tripping winding 2LRt of relay 2LR.

As aforementioned, certain of the initiating and stopping control instrumentalities would not be duplicated in the control systems for each of the other motors 14b to 17b. More particularly, these control instrumentalities comprise the contactors F and R and their respective contacts, the latching relays 1LR and 2LR and their respective operating and latch-tripping windings and contacts, the relays FCR, RCR, and 1CR and their respective contacts, and the push-button switches 110, 112, 116 and 121 and their respective contacts.

Conductors 122 and 123, having connection with the end terminals of winding 26b of transformer 26, may be assumed to be connected in circuit with the primary windings of transformers, corresponding to windings 29a and 29b of transformer 29 in the control systems of each of the other motors. Likewise conductor 124 and 125, having connection with the aforementioned intermediate terminals of winding 26b of transformer 26, may be assumed to furnish power to the primary windings of transformers, corresponding to primary winding 77a of transformer 77, in the control systems of each of the other motors. Each of the conductors 33, 39, 96, 97, 99, and 103 may be assumed to respectively connect with a corresponding conductor in the control systems of each other of the other motors.

The operation of the control system and motor 13b will now be described.

Let it be assumed that all points of the bottom edge of curtain 11 are at stage level. Also let it be assumed that contacts 20a of limit switch 20 are closed and that the rotary contact arm 100a of selector switch 100 is in the position, wherein the adjusting arm of rheostat 61 is given a corresponding setting as depicted in Fig. 3a. So long as switch 110 is closed, conductor 111 will be connected to and at the same potential as conductor 34.

Assume that it is desired to raise the curtain 11 to the contour shown in Fig. 1, where the point of the bottom edge of curtain 11 to which cable 13 is attached is drawn to the level depicted. Raising of the curtain is initiated by momentary operation of switch 112. Such operation of switch 112 effects closure of its contacts 112a. Closure of contacts 112a completes a circuit from conductor 111, through contacts 112a, contacts 1LR¹ of latching relay 1LR, the operating winding Fc of contactor F, the contacts R³ of contactor R, and conductors 113 to conductor 35, thereby energizing the operating winding Fc of contactor F. Contacts $F^1$, $F^2$, $F^3$ and $F^4$ of contactor F thereupon close and contacts $F^5$ of said contactor open. Closure of contacts $F^1$ and $F^2$, as aforeindicated, effects connection of field winding f of motor $13^b$ to buses 42 and 43 for flow of D. C. exciting current therethrough in one direction, which may be assumed to be that direction which will effect rotation of the armature a in the forward direction, affording reeling-up of cable 13 on drum $13^a$. Closure of contacts $F^3$ completes a circuit from conductor 111, through the operating winding $FCR^c$ of relay FCR, and conductor 113 to conductor 35, to thereby energize the operating winding $FCR^c$ of relay FCR. Closure of contacts $F^4$ has no effect upon the control system under the conditions being described. The opening of contacts $F^5$ prevents the energization of the operating winding $R^c$ of contactor R, as by accidental operation of switch 121.

Energization of the operating winding $FCR^c$ of relay FCR effects closure of its contacts $FCR^1$ and $FCR^2$. Closure of contacts $FCR^1$ completes a circuit from the adjusting element of rheostat 104, through stationary contact 2 and rotary contact arm $100^a$ of selector switch 100, and resistor 101 to the point common between the adjusting element of rheostat 19, resistor 89 and resistor 99. With the adjusting element of rheostat 19 in the initial position depicted in Fig. $3^a$, the A. C. potential at the left-hand end of resistor 101 will be greater than the A. C. potential at the right-hand end thereof affording a potential drop thereacross to which the control grids $78^c$ and $81^c$ of tubes 78 and 81 are subjected. Such potential is out-of-phase with the A. C. potential of the anode $78^b$ of tube 78 and in-phase with the A. C. potential of the anode $81^b$ of tube 81. Consequently tube 81 is rendered conducting while conduction of tube 78 is blocked. Initiation of conduction of tube 81 causes the operating winding $UCR^c$ of relay UCR to be energized and remains energized so long as tube 81 is maintained conducting.

Energization of the operating winding $UCR^c$ of relay UCR effects closure of its contacts $UCR^1$. Closure of contacts $UCR^1$ completes a circuit from conductor 111, through the then closed contacts $F^3$, contacts $UCR^1$, the operating winding $1M^c$ of contactor 1M, and conductor 113 to conductor 35, to thereby energize the operating winding of contactor 1M.

Energization of the operating winding $1M^c$ of contactor 1M effects closure of its contacts $1M^1$ and $1M^3$ and opening of its contacts $1M^2$. Closure of contacts $1M^1$ completes a connection from the center-tap terminal of the secondary winding $26^b$ of transformer 26, through conductors 32 and 33, armature a of motor $13^b$, contacts $1M^1$, and contacts $20^a$ of limit switch 20, to the cathodes $27^a$ and $30^a$ of tubes 27 and 30, thereby completing the operating power connections for motor $13^b$ to enable its running in the forward direction. Closure of contacts $1M^3$ completes a circuit from conductor 111, through the then closed contacts $F^3$, contacts $1M^3$, the operating winding $F^c$ of relay F, contacts $R^3$, and conductor 113 to conductor 35, to provide a maintaining circuit for the operating winding $F^c$ of relay F upon release of switch 112. The opening of contacts $1M^2$ interrupts the charging connections for capacitor 75.

When switch 112 is released the contacts $112^a$ reopen and the contacts $112^b$ reclose. Reclosure of contacts $112^b$ completes a circuit from conductor 111, through the then closed contacts $F^3$ and $1M^3$, contacts $1LR^1$, contacts $112^b$, contacts $116^a$, contacts $1LR^2$, the operating winding $1LR^c$ of relay 1LR, contact $R^3$, and conductor 113 to conductor 35, to thereby energize operating winding $1LRC$ of relay 1LR. Energization of operating winding $1LR^c$ effects opening of contacts $1LR^1$ and $1LR^2$ and closing of contacts $1LR^3$. Opening of contacts $1LR^1$ and $1LR^2$ interrupt the circuit through operating winding $1LR^c$ thereby deenergizing the same, but due to the mechanical latch $1LR^1$ falling in place, the contacts of relay 1LR remain in the aforementioned operating portions attained by the momentary energization of operating winding $1LR^c$.

Motor $13^b$ will have an operating speed as dictated by the setting of the adjusting element of rheostat 61. Such setting of the adjusting element of rheostat 61 is dependent upon the operating position selected for selector switch 100, due to the aforementioned mechanical connection between the adjusting element of rheostat 61 and the rotary contact arm $100^a$ of switch 100.

The range of operation of motor $13^b$ in the forward direction is dictated by which of the rheostats 104, 105, 106, etc., has its adjusting element connected in circuit with the control grids $78^c$ and $81^c$ of tubes 78 and 81. It has been assumed in the present instance that the adjusting element of rheostat 104 is in circuit with the last mentioned control grids.

With rheostat 104 in circuit with control grids $78^c$ and $81^c$, the setting of the adjusting element of rheostat 61 will be such, that the operating speed of motor $13^b$ will be proportional to the range of operation in the forward direction preselected therefor.

As will be understood, the arrangement of the range determining rheostats and speed determining rheostats will be the same in the control systems for each of the other motors $14^b$ to $17^b$, so that the points on the bottom edge of curtain to which the cables 13 to 17 are attached will arrive at their respective final levels, to provide a desired contour, at substantially the same instant. In other words, all of the motors $13^b$ to $17^b$ will operate through their respective preselected ranges in substantially the same interval of time; their respective base speeds being proportional to the particular range through which they operate.

It will be appreciated that the secondary winding $44^b$ of transformer 44, capacitor 47 and resistor 48 comprises a phase-shift network affording an A. C. potential, having a fixed phase angle with respect to the A. C. potential on the anodes of tubes 27 and 30, to which the control grids $27^c$ and $30^c$ of tubes 27 and 30 are subjected. This A. C. potential is superimposed on a D. C. potential which varies in magnitude as will now be explained.

The secondary winding $44^c$ and full-wave rectifier tube 53 afford a source of rectified voltage. Control grids $27^c$ and $30^c$ of tubes 27 and 30 are connected to the cathode of tube 53 through conductor 64 and resistors 57 and 56 and would be subjected to a constant unidirectional potential except for the effect of IR compensation and current limiting circuits as will be hereinafter explained.

Capacitor 75 and resistor 76 are connected through conductors 74 and 79, and resistor 36 to cathodes $27^a$ and $30^a$ of tubes 27 and 30, and through contacts $1CR^1$ to the adjusting element of rheostat 61. Capacitor 75 is also connected to the cathodes of tube 53 whenever contacts $1M^2$ and 2M² of contactors 1M and 2M, respectively, are closed. Thus, prior to operation of switch 112, capacitor 75 will be charged to the potential of the cathode 53ᵃ of tube 53, and consequently, the potential of the grids 27ᶜ and 30ᶜ of tubes 27 and 30 will be substantially that of their associated cathodes 27ᵃ and 30ᵃ. When contact 1M² opens, as a result of operation of switch 112, capacitor 75 is disconnected from cathode 53ᵃ of tube 53 and then discharges through the resistor 76. Consequently the potential of grids 27ᶜ and 30ᶜ rise relative to the cathodes 27ᵃ and 30ᵃ, thereby rendering the tubes 27 and 30 increasingly conducting, until capacitor 75 discharges to the potential of the adjusting element of rheostat 61, which determines the normal level of conductivity of tubes 27 and 30. It will thus be apparent that armature $a$ is not subjected to full potential instantaneously, but rather according to the time constant of the capacitor 75 and resistor 76, and until the current limit circuit, hereinafter explained, can take over acceleration to the preselected operating speed.

It will be appreciated that the load on motor 13ᵇ will not be constant during its range of operation in the forward direction. This is due to the fact that as curtain 11 is drawn upwardly it folds or drapes and the loading will not be equal on all the cables 13 to 17 and will change on these various cables as the curtain is drawn up to a preselected contour. Thus IR or load compensation is provided in the present control system. If the load on the armature $a$ increases, the current drawn by the armature will increase causing increase in the current flowing in the windings 29ᵃ and 29ᵇ of transformer 29. Increased current flow in windings 29ᵃ and 29ᵇ results in increased potential induced in secondary winding 29ᶜ of transformer 29. Consequently, the potential of the adjusting element of rheostat 68 increases in the negative sense relative to the conductor 66, thereby increasing in a negative sense the potential of control grid 54ᶠ relative to cathode 54ᵈ in the right-hand half of duo-triode tube 54. This results in decreased conductivity of the right-hand half of tube 54, thereby causing increase in the magnitude of the unidirectional potential to which control grids 27ᶜ and 30ᶜ of tubes 27 and 30 are subjected. As a result tubes 27 and 30 are caused to fire earlier in their respective conducting half-cycles, thereby increasing the flow of current to armature $a$ to maintain the speed of motor 13ᵇ at preselected value. As will be understood, the reverse of the aforedescribed action occurs upon decrease in load on armature $a$.

The aforedescribed IR compensation is subject to current limiting action afforded by the left-hand half of tube 54. This half of the tube is normally non-conducting. As the potential induced in winding 29ᶜ of transformer increases, the potential of control grid 54c increases relative to cathode 54ᵃ and upon sufficient increase in such potential the left-hand half of tube 54 becomes suddenly conducting to thereafter, not only prevent further increase, but also to decrease the unidirectional potential to which control grids 27ᶜ and 30ᶜ of tubes 27 and 30 are subjected. Thus the conduction of the left-hand half of tube 54 definitely limits the maximum effective current that can be supplied by tubes 27 and 30, and hence the maximum current that can be drawn by the armature $a$ of motor 13ᵇ.

As the armature $a$ rotates in the forward direction, the adjusting element of rheostat 19 may be assumed to be driven in the clockwise direction (as shown in Fig. 3ᵃ) relative to its associated resistance element. As the adjusting element of rheostat 19 advances in the clockwise direction the potential drop across resistor 101 decreases, and approaches a potential, the magnitude of which is determined by the adjustment of potentiometer rheostat 92, which prevents further conduction of tube 81. Consequently, the operating winding UCRᶜ of relay UCR is deenergized with resulting opening of the contacts UCR¹. Opening of contacts UCR¹ results in deenergization of the operating winding 1Mᶜ of contactor 1M, with following opening of its contacts 1M¹ and 1M³ and closing of its contacts 1M². As will be readily understood, all relays and contactors which were energized as an incident to operation of switch 112, will thereafter be deenergized, and the power connections to the field $f$ and armature $a$ of motor 13ᵇ will be interrupted. Motor 13ᵇ thereafter comes to rest immediately due to the locking action afforded by self-locking worm gearing 21 in the connection between said motor and hoisting drum 13ᵃ driven thereby.

It will be appreciated that if selector switch 100 were positioned to connect one of the other rheostats 104, 105, etc. in circuit with the control grids 78ᶜ and 81ᶜ of tubes 78 and 81, the range of operation of motor 13ᵇ in the forward direction would be different and would depend upon the adjustment of the adjusting element of the particular rheostat of the group 104, 105, etc. connected in circuit.

If the curtain 11 is at stage level and the rotary contact arm 100ᵃ of switch 100 is in engagement with stationary contact 1, then motor 13ᵇ will not be energized as no potential drop would exist across resistor 101. Such positioning of selector switch 100, thus permits maintaining the points of curtain 11 to which cable 13 is attached at stage level when desired in certain contours.

The control systems for the other motors 14ᵇ to 17ᵇ would have a similar arrangement of range controlling rheostats and selector switch. Thus a desired contour may be readily preselected by appropriate positioning of the selector switches of each of the control systems for the motors 13ᵇ to 17ᵇ. Although not shown, all of such selector switches would preferably be grouped together on a common control panel so as to facilitate the setting of a desired contour by an operator.

Assume now that the curtain 11 is at the contour shown in Fig. 1, and it is desired to return it to stage level. Momentary operation of switch 121 affords initiation of functioning of the control system of motor 13ᵇ for operation in the reverse direction to effect lowering of cable 13 as will now be described. Such operation of switch 121 effects closure of its contacts 121ᵃ and opening of its contacts 121ᵇ. Closure of contacts 121ᵃ completes a circuit from conductor 111, through contacts 121ᵃ, the operating winding Rᶜ of contactor R contacts F⁵, and conductor 113 to conductor 35, thereby energizing the operating winding Rᶜ of contactor R.

Energization of the operating winding Rᶜ of contactor R results in closure of its contacts R¹, R², R⁴ and R⁵. Closure of contacts R¹ and R² effect the connection of field $f$ of motor 13ᵇ across buses 42 and 43 so that the flow of energizing current through such field will be that required for rotation of armature $a$ in the reverse direction. Closure of contacts R⁴ has no effect in the present operation of the control system. Closure of contacts R⁵ establishes a circuit from conductor 111, through the operating winding RCR$^c$ of relay RCR, and conductor 113 to conductor 35, thereby effecting energization of the operating winding RCR$^c$ of relay RCR. Opening of contacts F³ prevents establishment of a circuit through the operating winding F$^c$ of contactor F, as by accidental operation of switch 112. Energization of the operating winding RCR$^c$ of relay RCR results in closure of its contacts RCR¹ and RCR². Closure of contacts RCR¹ establishes a circuit from conductor 103, through stationary contact 1 of switch 100, contacts RCR¹ and resistor 101 to the point common between the adjusting element of rheostat 19, resistor 89 and resistor 90.

It will be understood that the adjusting element of rheostat 19 would initially be at some position between that depicted in Fig. 3$^a$ and the lower end of its associated resistance element. The left-hand end of resistor 101 will be at the A. C. potential of conductor 103 and the adjusting element of rheostat 19 will be at some higher A. C. potential. The control grids 78$^c$ and 81$^c$ of tubes 78 and 81 will thus initially be subjected to a net A. C. potential which is in phase with the anode potential of tube 78 and out-of-phase with the anode potential of tube 81. Such A. C. potential will be sufficiently high to render tube 78 conducting, and of course conduction of tube 81 will be blocked.

The operating winding DCR$^c$ of relay DCR becomes energized upon tube 78 being rendered conducting and the contacts DCR¹ of relay DCR close. Closure of contacts DCR¹ establishes a circuit from conductor 111, through the then closed contacts R⁵, contacts DCR¹, the operating winding 2M$^c$ of contactor 2M, and conductor 113 to conductor 35, thereby effecting energization of the operating winding 2M$^c$ of contactor 2M.

Energization of the operating winding 2M$^c$ of contactor 2M results in the closure of its contacts 2M¹ and 2M³ and in opening of its contacts 2M². Closure of contacts 2M¹ establishes a circuit from the center-tap terminal of secondary winding 26$^b$ of transformer 26, through conductors 32 and 33, armature $a$, contacts 2M¹, and contacts 20$^b$ of limit switch 20 to the cathodes 27$^a$ and 30$^a$ of tubes 27 and 30, thus completing the power connections for motor 13$^b$. Closure of contacts 2M³ provides a maintaining circuit for the energizing winding R$^c$ of contactor R so that the same will be maintained energized following reopening of contacts 121$^a$ upon release of switch 121.

When switch 121 is subsequently released contacts 121$^a$ reopen and contacts 121$^b$ reclose. Reclosure of contacts 121$^b$ establishes a connection from conductor 111, through the then closed contacts R⁵, contacts 2M³, contacts 121$^b$, the then closed contacts 1LR³, the latch-tripping winding 1LR$^t$ of relay 1LR, contacts F⁵, and conductor 113 to conductor 35 to effect energization of winding 1LT$^t$. Energization of winding 1LR$^t$ affords release of the mechanical latch 1LR¹ and relay 1LR is thus returned to its normal operating condition preparatory to its reoperation as a result of operation of switch 112.

Motor 13$^b$ thereafter operates in the reverse direction. The behavior of the part of the control system regulating the conduction of tubes 27 and 30 will be the same as hereinbefore described.

Due to the closure of contacts RCR¹ and because contacts FCR¹ are then open, the potential of the adjusting element of rheostat 19 will be compared with the A. C. potential at the lefthand end of resistor 101. Now as the adjusting element of rheostat 19 is driven in the anti-clockwise direction as a result of operation of motor 13$^b$ in the reverse direction, its potential will decrease in magnitude. When the potential drop across the resistor 101 becomes substantially zero, the A. C. potential on control grid 78$^c$ decreases to a value at which tube 78 is cut off. As a result, the operating winding DCR$^c$ of relay DCR is deenergized thereby effecting opening of contacts DCR¹. Opening of contacts DCR¹ results in deenergization of the operating winding 2M$^c$ of relay 2M³ and the contacts 2M³ thereupon effecting deenergization of the operating winding R$^c$ of contactor R. The contacts R¹, R², R⁴ and R⁵ thereupon open resulting in interruption of the power connector to the field $f$; the power connections to armature $a$ having previously interrupted by opening of contacts 2M¹. Motor 13$^f$ is thus stopped and the point of the bottom edge of curtain 11 to which cable 13 is attached will then be at stage level.

The control systems for the other hoisting motors 14$^b$ to 17$^b$ will operate in a similar manner and the points to which their associated cables are attached will arrive at stage level substantially simultaneously with the point to which cable 13 is attached.

When it is desired to raise curtain 11 clear of the proscenium of the stage, with all points of the bottom edge of the curtain being raised above the upper border of the proscenium at the same rate of speed, such can be accomplished in the present control system by momentary operation of switch 116, regardless of the setting of selector switch 100 and of the corresponding selector switches in the control systems of the other motors.

Let it be assumed that all points of the bottom edge of curtain 11 are at stage level, and that switch 116 is momentarily operated. Such operation of switch 116 results in opening of its contacts 116$^a$ and in closing of its contacts 116$^b$. Closure of contacts 116$^b$ completes a circuit from conductor 111, through contacts 116$^a$, the operating winding 1CR$^c$ of relay 1CR, and conductor 113 to conductor 35, thereby energizing the operating winding 1CR$^c$ of relay 1CR. Energization of the operating winding 1CR$^c$ of relay 1CR effects closure of its contacts 1CR², 1CR³, 1CR⁵ and 1CR⁶, and opening of its contacts 1CR¹ and 1CR⁴.

Closure of contacts 1CR⁵ completes a circuit from conductor 111, through the then closed contacts 116$^b$, contacts 1CR⁵, contacts 1LR¹, the operating winding F$^c$ of contactor F, contacts R³, and conductor 113 to conductor 35, to thereby energize the operating winding F$^c$ of contactor F. Contacts F¹, F², F³ and F⁴ thereupon close, and contacts F⁵ open. Thus the power connections for the field $f$ are completed for operation of motor 13$^b$ in the forward direction. Closure of contacts F³ of course effects energization of the operating winding FCR$^c$ of relay FCR and the contacts FCR¹ and FCR³ close. Closure of contacts F⁴ establishes a maintaining circuit for the operating winding F$^c$ of contactor F from conductor 111, through contacts F⁴, the then closed contacts 1CR⁶ and 1CR⁵, contacts 1LR¹, the operating winding F$^c$ of contactor F, etc., to conductor 35, to maintain such operating winding energized following reopening of contacts 116.

The opening of contacts 1CR¹ disconnects the adjusting element of rheostat 61 from capacitor 75 and resistor 76, and the closure of contacts 1CR² connects capacitor 75 and resistor 76 to the point common between resistor 60 and adjustable resistor 59. Thus motor 13ᵇ will be caused to operate at a higher base speed because of the inclusion of all of the resistance element of rheostat 61 and resistor 60 in the connection to the cathodes of tubes 27 and 30.

The closure of contacts FCR¹ connects the adjusting element of rheostat 104 to the left-hand end of resistor 101 as before, but because the contacts 1CR⁴ open, the conductor 103 will be at the same potential as conductor 97. Closure of contacts 1CR³ and FCR² completes a circuit from conductor 97 through resistor 108 and contacts 1CR³ and FCR² to the lower end of adjustable resistor 107.

Thus, even though selector switch 100 may have its rotary contact arm 109ᵃ engaged with stationary contact 2, the adjusting element of rheostat 104 will be essentially at the potential of conductor 97. Due to the inclusion of the adjustable resistor 108 in circuit, the adjusting element of rheostat 19 will have to be driven farther in the clockwise direction before a point is reached where the potential drop across resistor 101 becomes substantially zero. Preferably, the resistor 108 would also be included in circuit in the control systems for the motors 14ᵇ to 17ᵇ; the one resistor 108 serving for all the control systems to insure that all the motors will operate through identically the same range.

Tube 81 upon closure of contacts FCR¹, FCR² and 1CR³ and opening of contacts 1CR⁴ of course becomes conducting to energize the operating winding UCRᶜ of relay UCR. Energization of the operating winding UCRᶜ of relay UCR, as hereinbefore explained, results in completion of the power connection to armature a of motor 13ᵇ and said motor commences to operate in the forward direction. The part of the control system affording supply and regulation of current to the armature a operates as hereinbefore described.

The closure of contacts 116ᵇ of switch 116 also completes a circuit from conductor 111, through contacts 2LR¹, the operating winding 2LRᶜ of latching relay 2LR and conductors 117, 113 to conductor 35, thereby energizing operating winding 2LRᶜ. As a result, contacts 2LR² and 2LR³ close, and contacts 2LR¹ open. Opening of contacts 2LR¹ interrupts the circuit through the operating winding 2LRᶜ, thereby deenergizing the same. However, due to the mechanical latch 2LR¹ falling in place, the contacts of relay 2LR remain in the aforementioned operating positions attained as a result of momentary energization of operating winding 2LRᶜ.

Closure of contacts 2LR³ provides that upon subsequent operation of switch 121, an energizing circuit will be established for the latch-tripping winding 2LRᵗ to afford release of relay 2LR for return to its normal operating position.

When switch 116 is released its contacts 116ᵃ reclose and its contacts 116ᵇ reopen. Reclosing of contacts 116ᵃ completes a circuit from conductor 111, through contacts F⁴, through either contacts 1CR⁶ or 2LR², through conductor 118, contacts 1CR⁵, the then closed contacts 112ᵇ of switch 112, contacts 116ᵃ, contacts 1LR², operating winding 1LRᶜ of relay 1LR, conductor 117, contacts R³, and conductor 113 to conductor 35, thereby to energize operating winding 1LRᶜ of relay 1LR. Such energization of winding 1LRᶜ results in contacts 1LR¹ and 1LR² being opened and maintained open until switch 121 is subsequently operated.

Motor 13ᵇ will continue to operate in the forward direction and as the adjusting element of rheostat 19 is driven in the clockwise direction, the A. C. potential between conductor 97 and the right-hand end of resistor 101 will decrease in value until a point is reached where there is substantially zero potential drop across resistor 101 and tube 81 will then be cut off to thereafter cause stopping of motor 13ᵇ in the manner hereinbefore described. When motor 13ᵇ has stopped it may be assumed that the point of the bottom edge of curtain 11 to which cable 13 is attached has been raised to some level above the upper border of the proscenium, and that all the other motors 14ᵇ to 17ᵇ have effected raising of all other points of the bottom edge of curtain 11 to the same level.

When curtain 11 has attained such a level and it is desired to return it to stage level, such is attained by operation of switch 121 which functions to initiate operation motor 13ᵇ in the reverse direction in the manner hereinbefore described.

Operation of switch 110, during operation of motor in either the forward or reverse directions affords stopping of the same, it being apparent that opening of the switch 110 affords deenergization of all contactors and relays that may then be energized.

I claim:

1. In a contour system for stage encore curtains or the like, the combination with a plurality of reversible direct current hoisting motors, of control systems individual to each of said motors to be subjected to supply from an alternating current source comprising means settable at will to preselect anyone of a plurality of preset but adjustable ranges of operation for its associated motor, and means for supplying the armature of said associated motor with rectified current including means responsive to the setting of the first mentioned means to regulate the armature current in accordance with the range of operation selected for said associated motor, and control means common to the control systems of all of said motors for initiating operation of all of said motors in the same direction simultaneously.

2. In a contour system for stage encore curtains or the like, the combination with a plurality of reversible direct current hoisting motors, of control systems individual to each of said motors to be subjected to supply from an alternating current source comprising means settable at will to preselect anyone of a plurality of preset but adjustable ranges of operation for its associated motor, and means for supplying the armature of said associated motor with rectified current including means responsive to the setting of the first mentioned means to regulate the armature current in accordance with the range of operation selected for said associated motor, and further including means responsive to variations in load on said associated motor to regulate the current supplied to its armature for constant speed operation, and control means common to the control systems of all of the motors for initiating operation of all of the motors in the same direction simultaneously.

3. In a contour system for stage encore curtains or the like, the combination with a plurality of reversible direct current hoisting motors, of control systems individual to each of said motors to be subjected to supply from an alternating current source comprising means settable at will to preselect anyone of plurality of preset but adjustable ranges of operation for its associated motor, and means for supplying the armature of said associated motor with rectified current including means responsive to the setting of the first mentioned means to regulate the armature current in accordance with the range of operation selected for said associated motor, means responsive to variations in load on said associated motor to regulate the current supplied to its armature for constant speed operation, and further including means for limiting the maximum value of current supplied to the armature of said associated motor, and control means common to the control systems of all of the motors for initiating operation of all of the motors in the same direction simultaneously.

4. In a contour system for stage encore curtains or the like, the combination with a plurality of reversible direct current hoisting motors, of control systems individual to each of said motors to be subjected to supply from an alternating current source comprising means settable at will to preselect anyone of a plurality of preset but adjustable ranges of operation for its associated motor and means for supplying the armature of said associated motor with rectified current including means responsive to the setting of the first mentioned means to regulate the armature current in accordance with the range of operation selected for said associated motor, and control means common to the control systems of all of the motors comprising means for initiating operation of all of the motors in the same direction through the ranges individually preselected therefor, and further comprising means for initiating operation of all of the motors in the same direction through the same predetermined range regardless of the individual ranges preselected therefor by the first mentioned means.

5. In a contour system for stage encore curtains or the like, the combination with a plurality of reversible direct current hoisting motors, of control systems individual to each of said motors to be subjected to supply from an alternating current source comprising means for controlling the range of operation of its associated motor including a plurality of potentiometer rheostats and a selector switch settable at will to render anyone of said rheostats effective to determine the range of operation of said associated motor in accordance with its setting, and means for supplying the armature of said associated motor with rectified current including means responsive to the setting of said selector switch to regulate the armature current in accordance with the range of operation selected for said associated motor, and control means common to the control system of all of said motors for initiating operation of all of said motors in the same direction simultaneously.

6. In a contour system for stage encore curtains or the like, the combination with a plurality of reversible direct current hoisting motors of control systems individual to each of said motors to be subjected to supply from an alternating current source comprising means for controlling the range of operation of its associated motor including a plurality of potentiometer rheostats and a selector switch settable at will to render anyone of said rheostats effective to determine the range of operation of said associated motor in accordance with its setting, and means including controllable full-wave rectifying means for supplying the armature of said motor with rectified current and further including means responsive to the setting of said selector switch to regulate the output of said rectifying means in accordance with the range preselected for said associated motor, and control means common to the control systems of all of said motors for initiating operation of all of said motors in the same direction simultaneously.

7. In a contour system for stage encore curtains or the like, the combination with a plurality of reversible direct current hoisting motors of control systems individual to each of said motors to be subjected to supply from an alternating current source comprising means for controlling the range of operation of its associated motor including a plurality of potentiometer rheostats and a selector switch settable at will to render anyone of said rheostats effective to determine the range of operation of said associated motor in accordance with its setting, and means including controllable full-wave rectifying means for supplying the armature of said associated motor with rectified current, means responsive to the setting of said selector switch to regulate the output of said rectifying means in accordance with the range preselected for said associated motor, and further including electronic means responsive to variations in load on said associated motor to regulate said rectifying means to afford constant speed operation of said associated motor, and control means common to the control systems of all of the motors for initiating operation of all of the motors in the same direction simultaneously.

8. In a contour system for stage encore curtains or the like, the combination with a plurality of reversible direct current hoisting motors, of control systems individual to each of said motors to be subjected to supply from an alternating current source comprising means for controlling the range of operation of its associated motor including a plurality of potentiometer rheostats and a selector switch settable at will to render anyone of said rheostats effective to determine the range of operation of said associated motor in accordance with its setting, and means including controllable full-wave rectifying means for supplying the armature of said associated motor with rectified current, means responsive to the setting of said selector switch to regulate the output of said rectifying means in accordance with the range preselected for said associated motor, electronic means responsive to variations in load on said associated motor to regulate said rectifying means to afford constant speed operation of said associated motor, and further including electronic means which acts to limit the maximum value of current supplied by said rectifying means, and control means common to the control systems of all of the motors for initiating operation of all of the motors in the same direction simultaneously.

9. In a contour system for stage encore curtains or the like, the combination with a plurality of reversible direct current hoisting motors, of control systems individual to each of said motors to be subjected to supply from an alternating current source comprising means for controlling the range of operation of its associated motor including a plurality of potentiometer rheostats and a selector switch settable at will to render anyone of said rheostats effective to determine the range of operation of said associated motor in accordance with its setting, and means including controllable full-wave rectifying means for supplying the armature of said associated motor with rectified current, means responsive to the setting of said selector switch to regulate the output of said rectifying means in accordance with the range preselected for said associated motor, electronic means responsive to variations in load on said associated motor to regulate said rectifying means to afford constant speed operation of said associated motor, and further including electronic means which acts to limit the maximum value of current supplied by said rectifying means, and control means common to the control systems of all of the motors comprising means for initiating operation of all of the motors in the same direction through the ranges individually preselected therefor and means for initiating operation of all of the motors in the same direction through the same predetermined range regardless of the individual settings of the selector switches.

10. In a contour systems for stage encore curtains or the like, in combination, a plurality of cable hoist reeling drums, reversible direct current motors individual to each of said drums, driving connections between each drum and its associated motor including self-locking worm gearing, control systems individual to each of said motors to be subjected to supply from an alternating current source comprising means settable at will to preselect anyone of a plurality of preset but adjustable ranges of operation for its associated motor and means for supplying the armature of said associated motor with rectified current including means responsive to the setting of the first mentioned means to regulate the armature current in accordance with the range of operation selected for its associated motor, and control means common to the control systems of all of said motors for initiating operation of all of said motors in the same direction simultaneously.

PAUL M. FISCHER.

REFERENCES CITED

The following references are of record in the file of this patent:

UNITED STATES PATENTS

| Number | Name | Date |
| --- | --- | --- |
| 2,002,268 | Lassen et al. | May 21, 1935 |
| 2,032,107 | Boyle | Feb. 25, 1936 |